Figure 3:
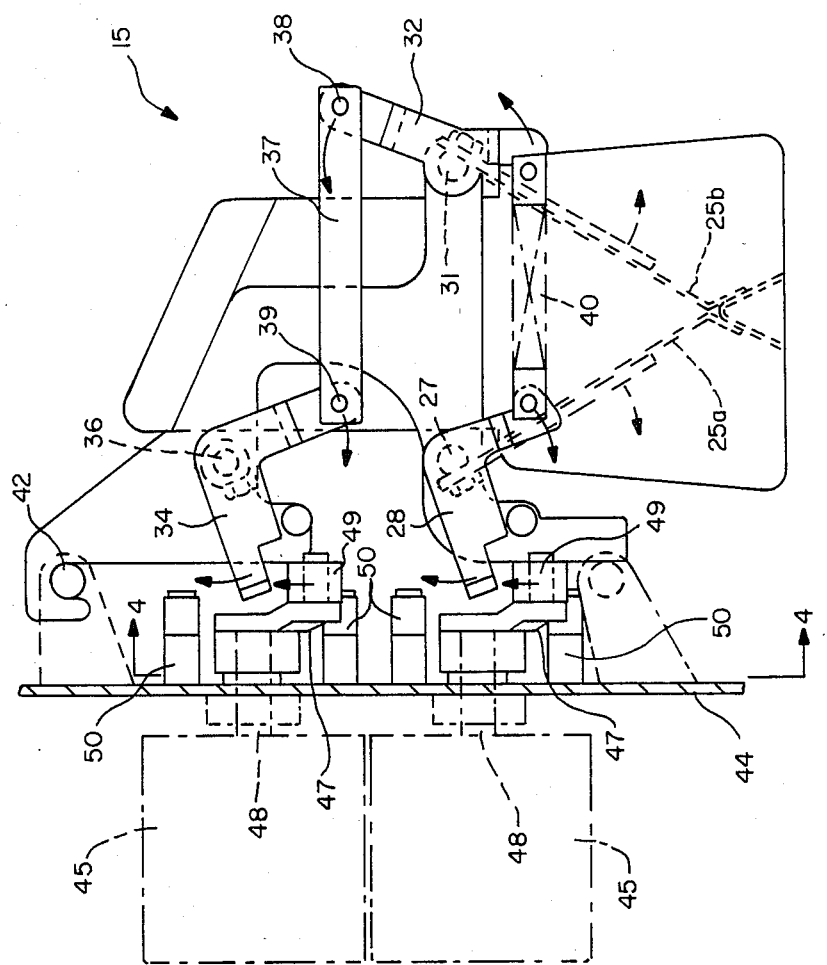

United States Patent [19]

Kitagawa et al.

[11] Patent Number: 4,662,462
[45] Date of Patent: May 5, 1987

[54] COMPACT COMBINATIONAL WEIGHING SYSTEM

[75] Inventors: Kazumi Kitagawa, Shiga; Atushi Fujiwara, Kyoto, both of Japan

[73] Assignee: Ishida Scales Manufacturing Company, Ltd., Shiga, Japan

[21] Appl. No.: 853,020

[22] Filed: Apr. 17, 1986

[51] Int. Cl.[4] ............................................. G01G 19/22
[52] U.S. Cl. ........................................................ 177/25
[58] Field of Search ........................................... 177/25

[56] References Cited

U.S. PATENT DOCUMENTS

| | | | |
|---|---|---|---|
| 4,549,619 | 10/1985 | Fujiwara | 177/25 |
| 4,605,082 | 8/1986 | Matsuura | 177/25 |
| 4,610,322 | 9/1986 | Sugioka et al. | 177/25 |
| 4,616,722 | 10/1986 | Moran | 177/25 X |
| 4,618,011 | 10/1986 | Sashiki et al. | 177/25 X |

Primary Examiner—George H. Miller, Jr.
Attorney, Agent, or Firm—Flehr, Hohbach, Test, Albritton & Herbert

[57] ABSTRACT

A compact combinational weighing apparatus comprises a compact housing structure for weighing devices and a remote control unit which are connected only by an elongate signal-transmitting cable. Inside the housing are a number of article batch handling units disposed in a linear array. Each article batch handling unit includes a pool hopper of a double-gate structure for receiving an article batch from an article feeder and two weigh hoppers for weighing received article batches. The article batch in the pool hopper is selectably discharged into either of the weigh hoppers below by opening the gate corresponding to the selected weigh hopper. The two gates of each pool hopper are closed by a single spring and opened by individual rotary solenoids. Load cells for weighing the article batches in the pair of weigh hoppers belonging to each article batch handling unit are disposed in mutually lined-symmetrical relationship with respect to a horizontal line. Rotary solenoids for opening the weigh hopper gates are disposed in efficiently space-saving manners. A funnel-shaped article discharging unit into which article batches are discharged from weigh hoppers has buffer plates strategically placed to uniformize the time it takes for article batches from the various weigh hoppers to reach an outlet at its bottom.

8 Claims, 12 Drawing Figures

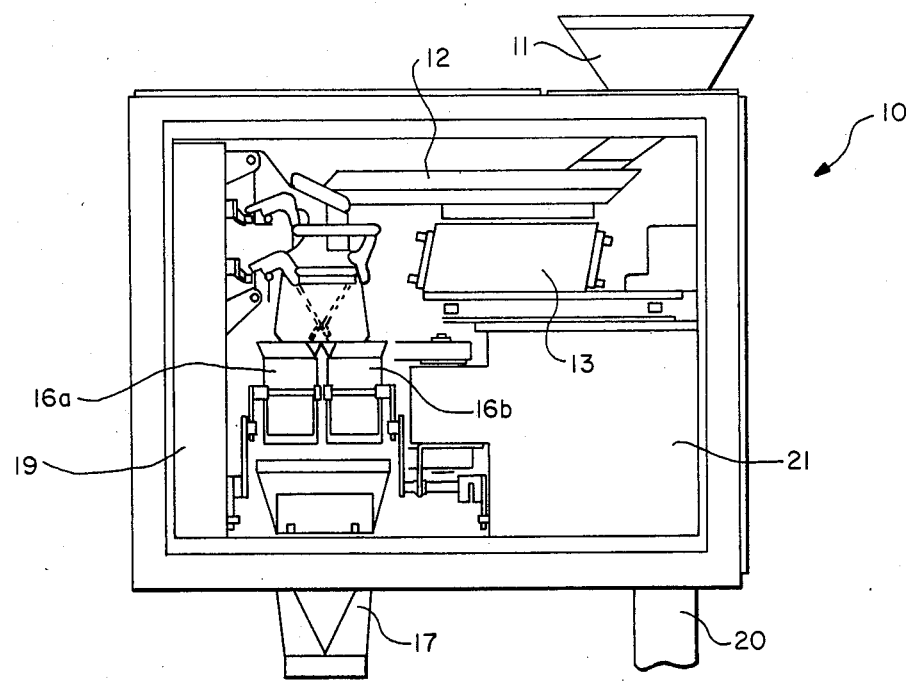
FIG. —1
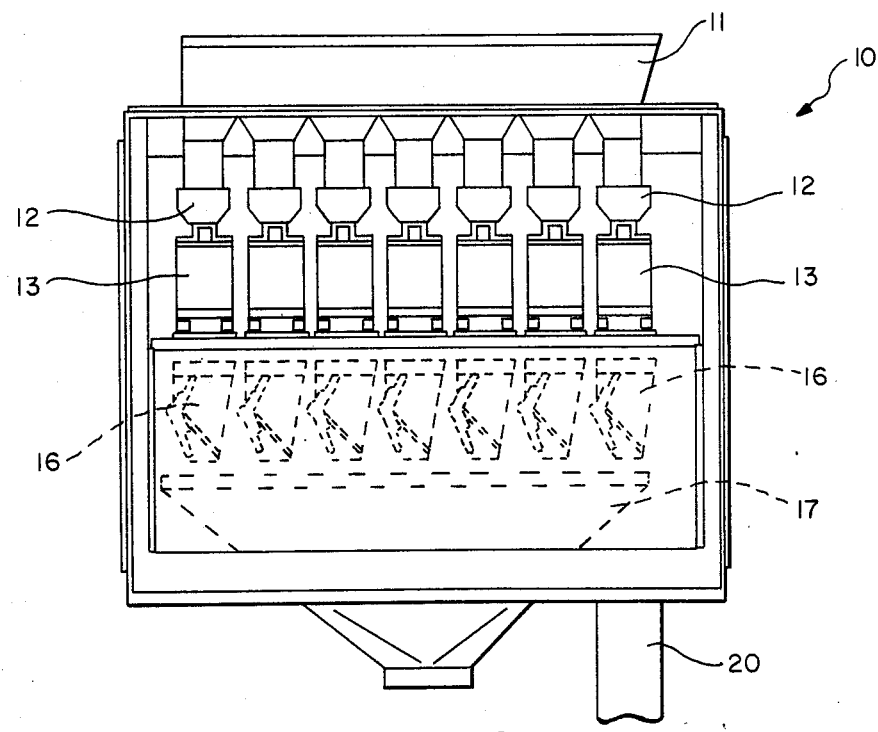
FIG. —2

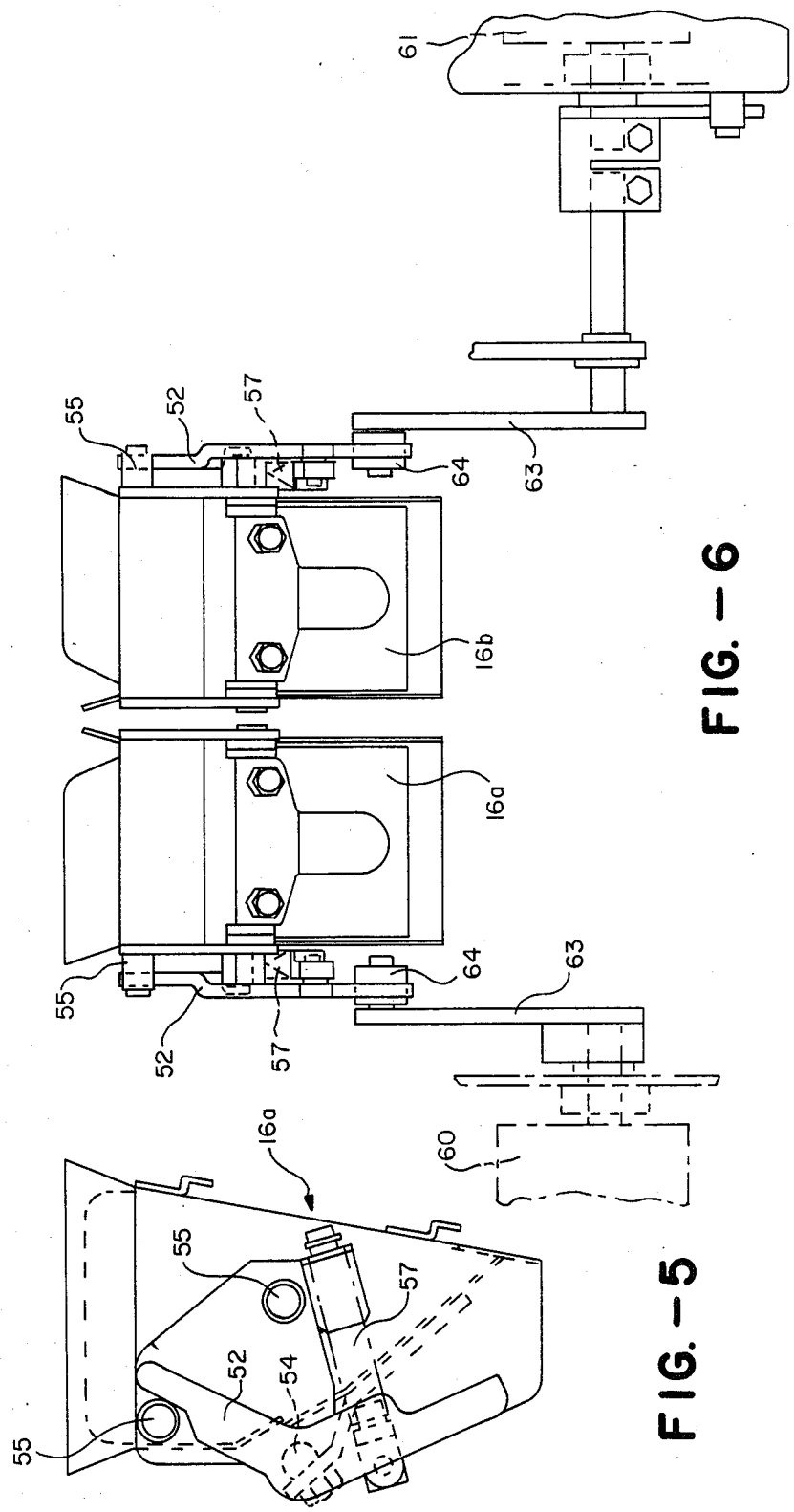

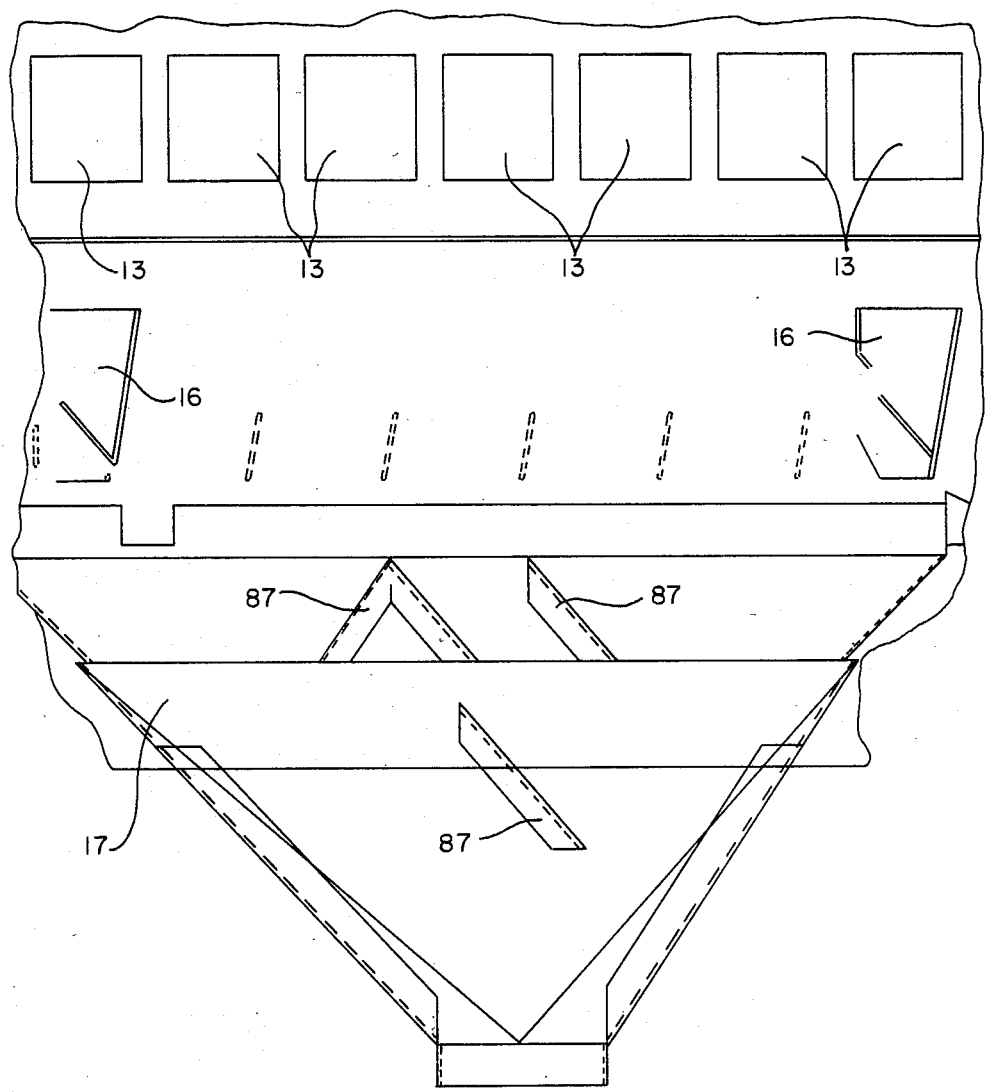
FIG. — 10

COMPACT COMBINATIONAL WEIGHING SYSTEM

This invention relates to a compact combinational weighing system and more particularly to a combinational weighing system comprising a compact structure which houses weighing apparatus and a separate remote control unit which is connected thereto through a flexible cable.

By combinational weighing is meant weighing articles by a plurality of weighing devices, performing arithmetic operations for combinations of measured weight values and then selecting a combination according to a predetermined criterion. The major features of combinational weighing are great accuracy and high throughput. Electronic control units for such combinational weighing systems have been disclosed, for example, in U.S. Pat. No. 4,396,078. Systems with weighing devices arranged radially in a circular formation around an article distributing table have been disclosed, for example, in U.S. Pat. Nos. 4,398,612, 4,520,884, 4,535,855 and 4,544,042 as well as Japanese Patent Publication Tokkai No. 60-85332. Systems with weighing devices arranged linearly have been disclosed, for example, in U.S. Pat. Nos. 4,534,429 and 4,538,693 as well as Japanese Patent Publications Tokkai No. 59-63525 and 59-133435. Improved hopper designs and arrangements have been disclosed, for example, in U.S. Pat. Nos. 4,527,647 and 4,545,446 as well as Japanese Utility Publication Jikkai No. 60-185231. Improvements with respect to speed and accuracy have also been made but most systems which have been marketed are bulky and take up a significantly large floor space. Although compactness is a desirable characteristic in a combinational weighing system, an efficiently operable compact system cannot be obtained merely by scaling down an existing model or by a mere design choice.

It is therefore an object of the present invention to provide a compact combinational weighing system without sacrificing the generally anticipated features of combinational weighing related to speed and accuracy.

The above and other objects of the present invention are achieved by providing a combinational weighing system with a compact generally rectangular housing structure containing weighing devices connected with a remote controller unit by an elongate signal-transmitting cable. A number of article batch handling units are arranged in a transverse linear array. Article batches to be weighed are supplied to them by individual troughs in longitudinal directions. Each article batch handling unit includes a pool hopper of a double-gate structure and two single-gate weigh hoppers. The article batch received from the corresponding trough is discharged from the pool hopper selectively into one of the weigh hoppers by the opening of one of the pool hopper gates. Each weigh hopper is connected to a load cell which serves to measure the weight of the article batch received by the associated weigh hopper. The two gates of each pool hopper are made openable in the longitudinal direction while the gates of all weigh hoppers are made openable in the same transverse direction in order to avoid interference since hoppers are placed relatively close together to minimize the overall size of the housing structure. The two load cells associated with each pair of weigh hoppers belonging to the same article batch handling unit are disposed in a line-symmetrical relationship, one in an upside down position with respect to the other. A discharge chute at the bottom is provided with buffer plates so that article batches discharged from all weigh hoppers take about the same time to reach the outlet. The weight values measured by the load cells are transmitted to the remote control unit through the cable. Electric circuits inside the remote control unit perform a combinational computation in a known manner to select a combination and transmits signals to cause selected weigh hoppers to discharge their article batches.

Figure 4:
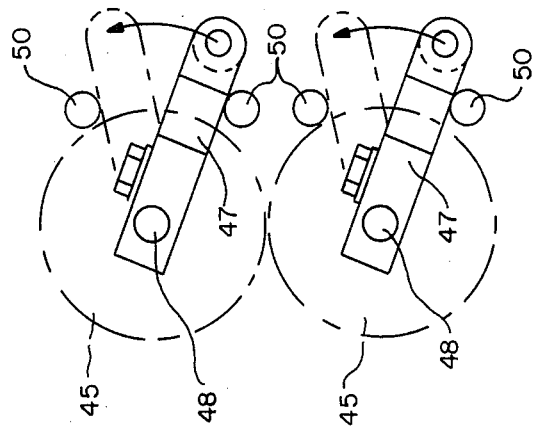
Figure 7:
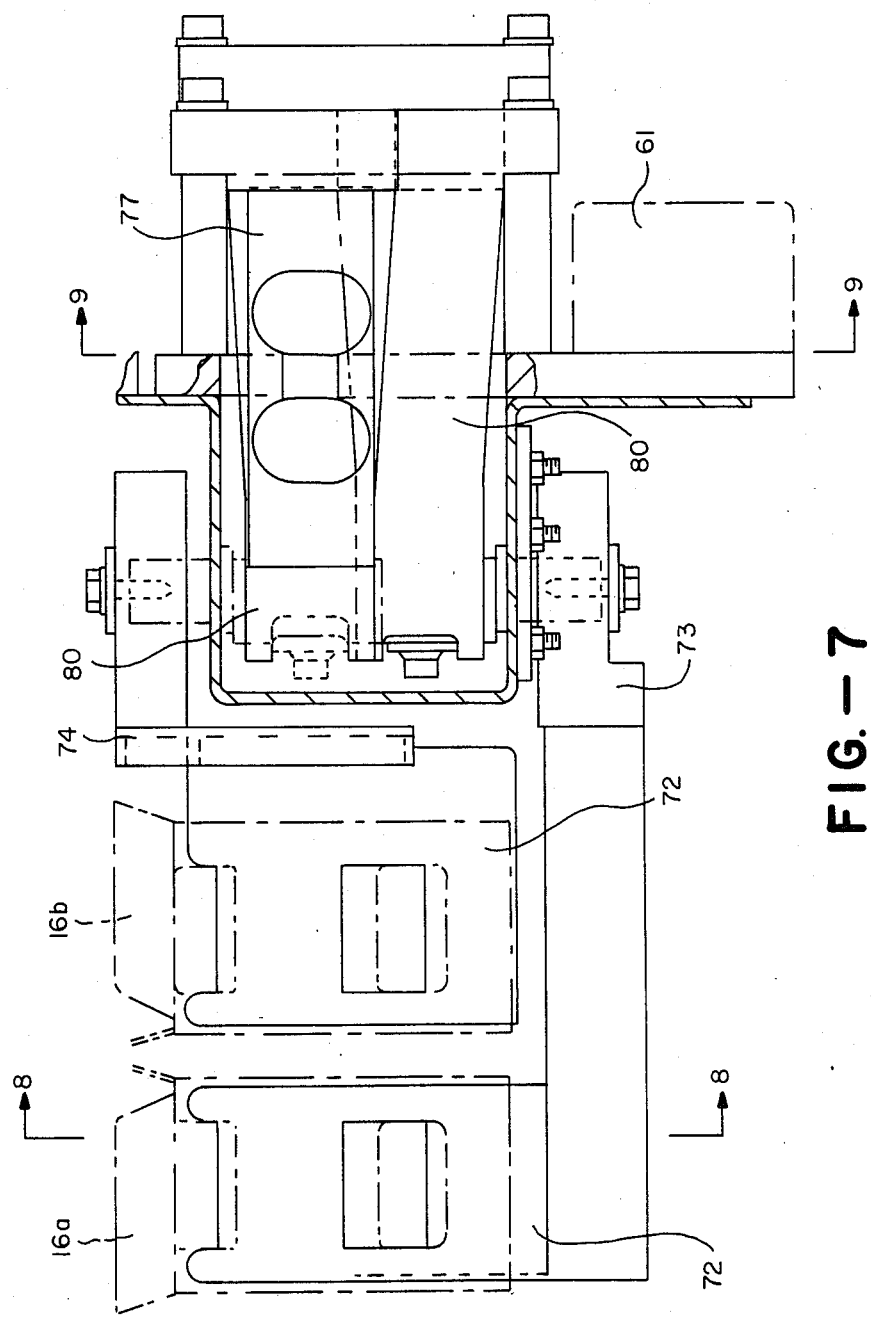
Figure 8:
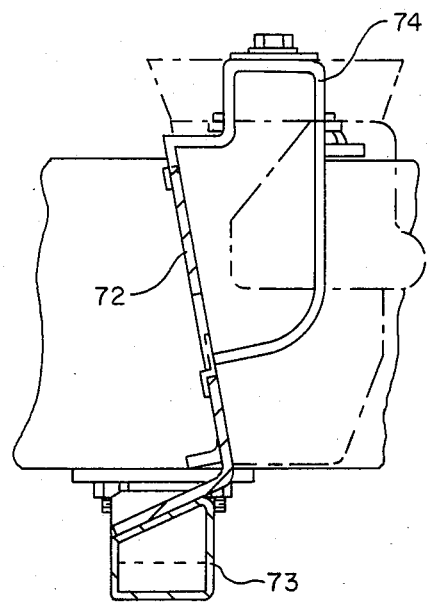
Figure 9:
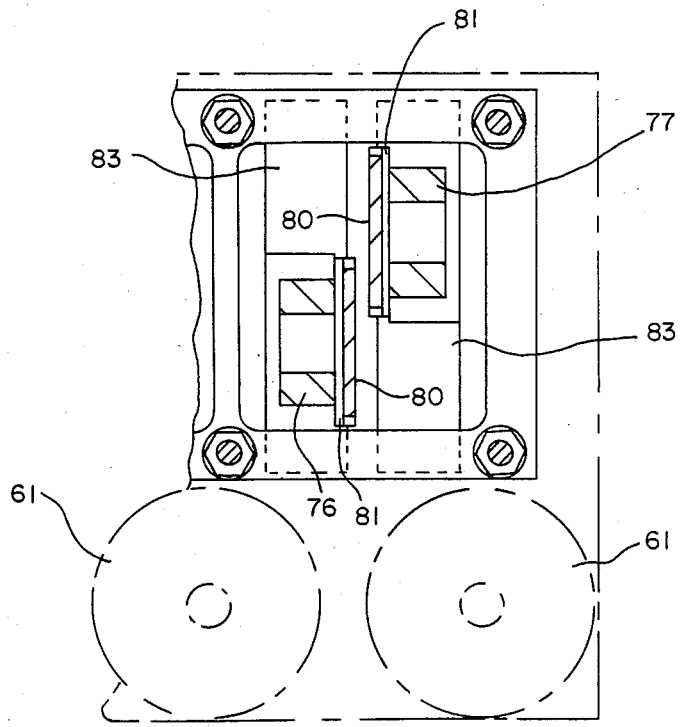
Figure 12:
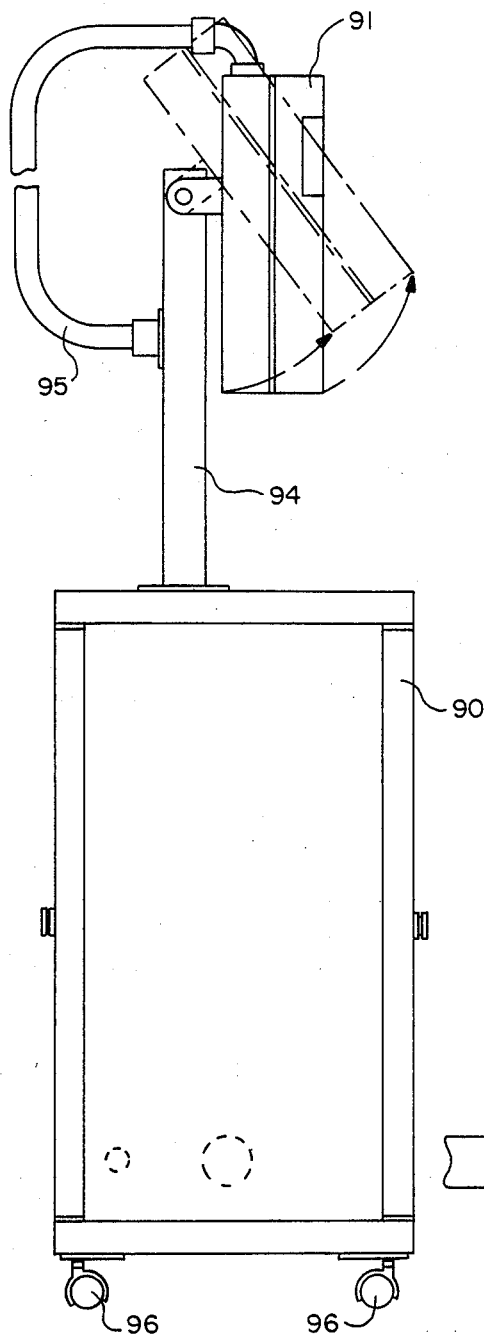
Figure 11:
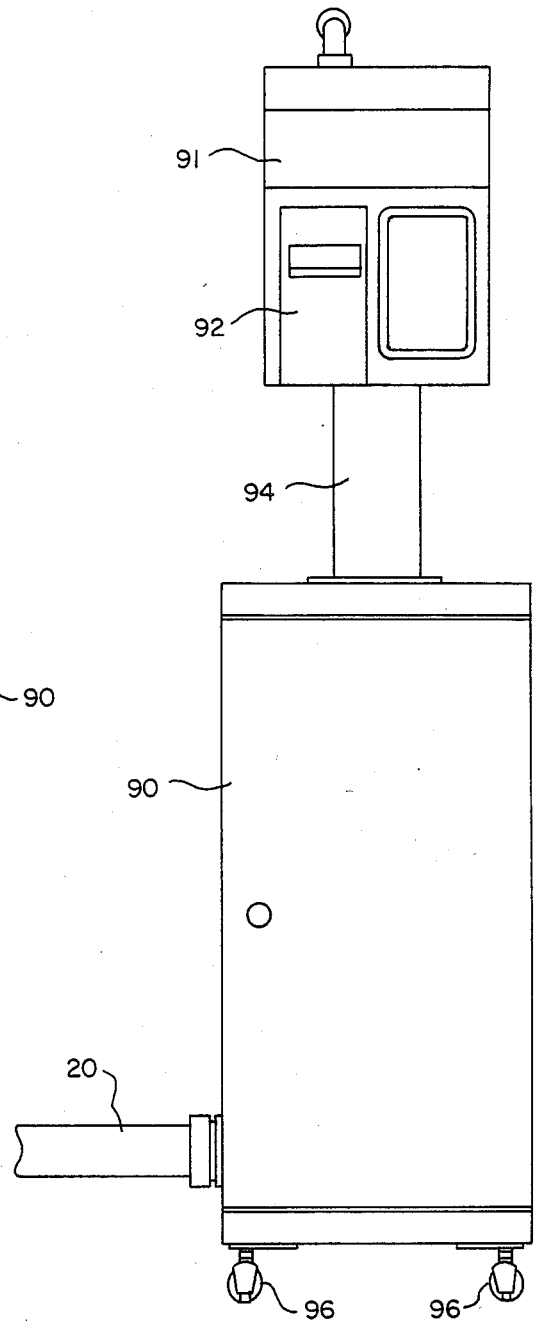

The accompanying drawings, which are incorporated in and form a part of the specification, illustrate a preferred embodiment of the present invention and, together with the description, serve to explain the principles of the invention. In the drawings:

FIGS. 1 and 2 are horizontal views of the interior of a structure for housing weighing devices according to one embodiment of the present invention, some of the components being omitted in order to show more clearly the positional relationships among hoppers and troughs, FIG. 1 being a view taken in a transverse direction and FIG. 2 in a longitudinal direction, FIG. 3 is a side view of a pool hopper inclusive of its gate-opening mechanism, FIG. 4 is a view taken along the line 4—4 of FIG. 3, FIG. 5 is a side view of a weigh hopper, FIG. 6 is an enlarged view of a portion of FIG. 1 showing weigh hoppers belonging to the same article batch handling unit and including the gate-opening mechanisms for them, FIG. 7 is the same view as taken in FIG. 6 except the gate-opening mechanisms are omitted and the hopper-weighing devices are shown, FIG. 8 is a view taken along the line 8—8 of FIG. 7, FIG. 9 is a view taken along the line 9—9 of FIG. 7, FIG. 10 is a sectional view of the discharge chute, FIG. 11 is a front view of the remote control unit, and FIG. 12 is a side view of the remote control unit.

According to a preferred embodiment of the present invention which will be described in detail below, a combinational weighing system with fourteen weighing devices comprises a structure (to be referred to as a weigher structure hereinbelow) which houses these weighing devices and a separate remote control unit which contains electrical circuits for controlling the operation of the entire system. The weigher structure and the remote control unit are connected by a flexible cable so that signals can be exchanged between them but they can be physically set apart by up to 10 meters.

In FIGS. 1 and 2, numeral 10 generally indicates the weigher structure. In view of the major object of the present invention to reduce the size of the system, the weigher structure 10 is shaped nearly like a square box with the maximum external dimensions of about 580 mm in length, about 565 mm in width and about 610 mm in height, exclusive of means such as conveyor belt for delivering articles to be weighed and a packaging unit into which weighed articles are discharged.

Reference being made to FIGS. 1 and 2 which show in the transverse and longitudinal directions the interior of the weigher structure 10 by omitting some of the components for convenience of explanation, there are seven substantially identically structured article batch handling units disposed in a linear array in the transverse direction, spaced substantially uniformly therebetween. A transversely elongate inlet hopper 11 is placed at the top section of the weigher structure 10 for receiving articles to be weighed from an article supply means such as a conveyor belt (not shown). The inlet hopper 11 has seven outlets at the bottom through which the articles delivered thereto will side into seven troughs 12 which are each longitudinally elongate, having an article receiving end and an article delivering end, and are parallel to each other in one-to-one relationships with the seven outlets of the inlet hopper 11 and the seven article batch handling units. Each trough 12 is supported from below by its own vibrator 13 such that articles delivered to its article receiving end are transported to the article delivery end by the vibratory motion of the trough 12 caused by the vibrator 13 and are delivered to the article batch handling unit corresponding to that trough 12.

Each article batch handling unit includes a pool hopper 15 and two weigh hoppers 16. The pool hopper 15 serves to receive an article batch from the trough 12 corresponding to the article batch handling unit to which it belongs and to selectively discharge the article batch into one of the weigh hoppers 16 disposed therebelow. Thus, the pool hopper 15 is generally below the article delivering end of the corresponding trough 12 and is provided with two gates at the bottom as will be described more in detail below. The two weigh hoppers 16 are disposed below the corresponding pool hopprr 15 and longitudinally adjacent to each other. Each weigh hopper 16 serves not only to receive an article batch from the pool hopper 15 disposed thereabove but also to weigh and discharge the received article batch. For the sake of identification, the two weigh hoppers in each article batch handling unit will be referred to as the front weigh hopper 16a and the back weigh hopper 16b, respectively, as shown in FIG. 1, the back weigh hopper 16b being on the side closer to the inlet hopper 11. Numeral 16 will be used where reference is made generally to both or either of the weigh hoppers 16a and 16b. Numeral 17 indicates a funnel-shaped discharge chute disposed below the array of weigh hoppers 16 and at the bottom of the weigher structure 10. It serves to receive article batches discharged from the weigh hoppers 16 and further to discharge them together into a packaging unit or the like (not shown) which is typically used in combination with the weighing system. Numeral 19 indicates a driver unit containing devices for opening hopper gates as will be explained below. Numeral 20 indicates an optical fiber cable which may be as long as 10 meters and connects to the remote control unit (not shown in FIGS. 1 and 2) for exchanging various signals for the operation of the system. Numeral 21 indicates a driving-and-weighing unit containing both hopper gate driving devices and weighing devices for measuring the weights of article batches in weigh hoppers 16.

FIG. 3 shows the structure of an individual pool hopper 15 inclusive of parts for opening its gates. As mentioned above, the pool hopper 15 is of a double-gate type. These gates will be referred to as the front gate 25a and the back gate 25b as shown in FIG. 3 for the sake of convenience and are adapted to swing open and close in the longitudinal direction. The front gate 25a is adapted to rotate around a horizontally fixed pivot 27 and is attached to an L-shaped member 28. The back gate 25b is adapted to rotate around another horizontally fixed pivot 31 and is attached to a connecting member 32. Another L-shaped member 34 is directly above the first L-shaped member 28 and is rotatably supported by still another horizontally fixed pivot 36. A straight linking piece 37 is rotatably connected through pins 38 and 39 respectively to one end of the connecting member 32 and to one end of the L-shaped member 34 to complete a linking mechanism. A spring 40 connects one end of the L-shaped member 28 and the end of the connecting member 32 distal to the pin 38 so as to keep the gate 25 closed by its compressive force. The pool hopper 15 is supported as a whole by a horizontal hanger bar 42 secured by supporting means to a vertical wall 44 of the driving unit 19.

For each article batch handling unit, two rotary solenoids 45 for opening the pool hopper gates 25 are provided inside the driver unit 19. Each of these rotary solenoids 45 has a radially extending arm 47 affixed to its axis 48. A roller is rotatably attached at the end of the arm 47 distal to the axis 48 such that, if the arm 47 is caused to rotate around the axis 48, the roller 49 will push the free end of the L-shaped member 28 or 34 in the upward direction. If the L-shaped member 28 is thus rotated in the clockwise direction (with reference to FIG. 3) around the pivot 27, this causes the front gate 25a to open by stretching the spring 40 to the left. If the free end of the L-shaped member 33 is pushed upward, its counterclockwise rotation around the pivot 36 causes the linking piece 37 to be pulled to the left, rotating the connecting member 32 in the counterclockwise direction around the pivot 31 and opening the back gate 25b by stretching the spring 40 to the right. Cylindrical stoppers 40 are affixed to the wall 44 and to the piool hopper 15 as shown to limit the extents of motion of the arms 47 and the L-shaped members 28 and 34. FIG. 4 is a view taken along the line 4—4 of FIG. 3 to show the positional relationships among the arms 47 and the stoppers 50. The positions of the arms 47 when the gates 25 are opened (one at a time) are delineated by dotted lines.

The mechanism for opening the weigh hopper gate is explained next by way of FIGS. 5 and 6, FIG. 5 being a side view of one of the weigh hoppers 16 and FIG. 6 being an enlarged, more detailed view of a portion of FIG. 1 including the weigh hoppers 16. Unlike the pool hoppers 15, the weigh hoppers 16 are of a single-gate structure. Although the relative directions in which hopper gates open are generally a matter of design choice if the hoppers are significantly far apart and there is no need to consider the possibilities of interference among the gates, hoppers according to the present invention must necessarily be disposed close to one another in order to reduce the overall size of the weigher housing 10. For the best result in avoiding interference among the hopper gates, all weigh hopper gates are made to open in the same direction as shown in FIG. 2 perpendicularly to the direction in which the pool hopper gates open. On each of the weigh hoppers 16, there is a V-shaped piece 52 attached to its gate and supported by a pivot 54 rotatably between two cylindrical stoppers 55. A spring 57 is provided to apply a biasing force on the V-shaped piece 52 such that the gate stays in the closed position as shown in FIG. 5. A rotary solenoid 60 for opening the front weigh hopper 16a is disposed inside the driver unit 19 below the rotary solenoids 50 for the pool hopper gates 25. Another rotary solenoid 61 for the back weigh hopper 16b is disposed in the bottom section of the driving-and-weighing unit 21. They are both provided with an arm 63 radially affixed to their axes and a roller 64 is rotatably secured to the free end of the arm 63 distal to the axis as explained in connection with the gate opening mechanism for the pool hopper. Thus, each of the rotary solenoids 60 and 61 serves to cause the corresponding arm 63 to rotate, thereby turning the V-shaped piece 52 to open the gate against the biasing force of the spring 57.

FIG. 7 is a view of a pair of weigh hoppers 16 belonging to the same article batch handling unit. The view is taken in the same direction as in FIG. 1 but gate-operating mechanisms explained above and shown in FIG. 6 are omitted for showing the hopper-weighing devices more clearly. FIG. 8 is a view taken along the line 8—8 of FIG. 7 and FIG. 9 is a view taken along the line 9—9 of FIG. 7. As shown in FIGS. 1 and 6, and more clearly in FIG. 7, the driving-and-weighing unit 21 has a middle section protruding horizontally towards the weigh hoppers 16, defining an upper horizontal wall and a lower horizontal wall. Reference being made to FIGS. 7, 8 and 9 together, numeral 72 indicates hanger plates attached to the weigh hoppers 16. The hanger plate attached to the front weigh hopper 16a is secured to a bracket 73 to communicate the weight of the weigh hopper 16a to a load cell 76 through the lower wall of the protruding section. The hanger plate attached to the back weigh hopper 16b is secured to another bracket 74 and the weight of the back weigh hopper 16b is communicated to another load cell 77 through the upper wall of the protruding section. The two load cells 76 and 77, each coupled with a plate 80 and a spacer 81 inserted inbetween, are disposed partially inside this protruding section and partially above the rotary solenoid 61 for the back weigh hopper 16b in a line-symmetrical relationship with each other with respect to a horizontal line (not shown) perpendicular to the plane of FIG. 9. Thus, as shown in FIGS. 7 and 9, the two load cells 76 and 77 are parallel to each other and at different vertical positions, one being upside down with respect to the other as they should because weights of the weigh hoppers 16 are communicated to them from different directions through their respective brackets 73 and 74.

Two rotary solenoids 61 for back weigh hoppers belonging to two mutually adjacent article batch handling units are also shown in FIG. 9 to explain why the two rotary solenoids 60 and 61 for each article batch handling unit are split, one in the driving unit 19 and the other in the driving-and-weighing unit 21.

It goes without saying that it is for making best use of the limited available space inside the compact weigher structure 10. FIG. 10 is a cross-sectional view of the discharge chute 17 to show buffer plates 87 disposed in such a way that article batches discharged from weigh hoppers (not all shown in FIG. 10) of all seven article batch handling units will take approximately the same time to reach the outlet at the bottom although the direct distance between the weigh hopper and the outlet at the bottom varies, depending on the position of the article batch handling unit from which the article batch is discharged.

FIGS. 11 and 12 are respectively a front and side view of a remote control unit according to an embodiment of the present invention intended to be connected to the weigher structure 10 through the cable 20. In FIGS. 11 and 12, numeral 90 indicates a housing for electrical circuits which control the overall operation of the system including performance of arithmetic computations of combinations, and numeral 91 indicates a remote operation box carrying an input/output means of a standard type inclusive of a built-in printer 92. The remote operation box 91 is adjustably mounted on a column 94 attached to the housing 90 and is connected to the electrical circuits inside the housing 90 by a flexible tube 95. The housing 90 is further provided with coaster wheels 96 at the bottom so that it can be moved easily.

The electrical circuits, which are for controlling the overall operation of the system and contained in the housing 90, are identical to those of Model CCW-S produced and sold by the assignee corporation and disclosed in U.S. patent application Ser. No. 772,244 filed Sept. 3, 1985 and assigned to the present assignee. According to a preferred embodiment of the present invention, the circuits are programmed to function substantially as disclosed in U.S. Pat. No. 4,396,078. To summarize, all fourteen weigh hoppers of the system are filled with article batches and the weights of these article batches are measured. Of the fourteen weight values now available to the control unit, up to ten are selected for combinational computation to select and identify combinations of these ten weight values which satisfy a predetermined criterion. This criterion is usually given in terms of a maximum value and a minimum value such that any combination which gives the combined weight between these limiting values is considered "acceptable". According to a preferred embodiment of the present invention, those of the combinations identified acceptable which do not include any pair of weigh hoppers belonging to the same article batch handling unit or include only one such pair are considered preferable and a selection is made from such preferred combinations. If there is no such combination among those identified acceptable, one which is the closest, for example, to a predefined target value is selected. Weigh hopper discharge signals are outputted from the control unit through the cable 20 so as to have the article batches discharged from the selected weigh hoppers. Thereafter, signals are similarly transmitted to the rotary solenoids for opening the gates of the pool hoppers corresponding to the selected weigh hoppers which have just discharged their article batches. Next, signals are transmitted to the vibrators 13 for the troughs 12 corresponding to the pool hoppers which have just been discharged. After these events of the cycle are completed, the system waits until another signal is received, for example, from a packaging unit being used in combination with this weighing system. When such a signal is received, a new set of ten weight values is selected by excluding those weigh hoppers which were selected in the previous cycle of combinational computation. The steps described above are repeated thereafter.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the number of article batch handling units is not limited to seven. The dimensions of the weigher housing can be changed likewise, the figures disclosed herein being but an example according to a preferred embodiment. In short, such modifications and variations which may be apparent to a person skilled in the art are intended to be included within the scope of this invention.

What is claimed is:

1. A compact combinational weighing apparatus comprising
   a weigher structure defining a longitudinal direction and a transverse direction,
   a remote controller, and a cable means which connects said weigher structure and said remote controller and serves to transmit signals therebetween, said weigher structure including a number of article batch handling units disposed linearly in said transverse direction in a mutually adjacent relationship, an article feeding means for accepting articles to be weighed and feeding article batches individually to said article batch handling units, and a discharging means disposed below said article batch handling units to receive article batches discharged from said article batch handling units, each of said article batch handling units comprising a pool hopper with two gates for receiving an article batch from said article feeding means and discharging said received article batch by opening one of said two gates, said pool hopper having a single spring means serving to maintain said two gates in closed positions and two rotary solenoids disposed one above the other and each serving to cause one of said gates to open against the compressive force of said spring means in response to a hopper operating signal transmitted from said remote controller through said cable means, and two weigh hoppers disposed below said pool hopper adjacent to each other in said longitudinal direction respectively for receiving said article batch discharged from said pool hopper through one of said two gates, weighing said received article batch, outputting a weight signal indicative of the weight of said article batch to said remote controller through said cable means and discharging said weighed article batch by opening a weigh hopper gate in said transverse direction.

2. The compact combinational weighing apparatus of claim 1 wherein said weigher structure has maximum external dimension of no greater than about 580 mm in said longitudinal direction, 570 mm in said transverse direction and 620 mm in height.

3. The compact combinational weighing apparatus of claim 1 wherein said number is no less than seven.

4. The compact combinational weighing apparatus of claim 1 wherein each of said article batch handling units further comprises a pair of load cells for measuring weights of said weigh hoppers inclusive of article batches therein, said pair of load cells being disposed in a line-symmetrical relationship with each other with respect to a horizontal line.

5. The compact combinational weighing apparatus of claim 1 wherein said discharging means is a funnel-shaped chute which has an outlet at the bottom and includes buffer plates so disposed that article batches discharged thereinto from said article batch handling units take about the same time to reach said outlet.

6. The compact combinational weighing apparatus of claim 1 wherein said weigher structure further includes a driving unit and driving-and-weighing unit sandwiching said article batch handling units therebetween, said driving unit having therein said rotary solenoids for said pool hoppers.

7. The compact combinational weighing apparatus of claim 6 wherein each of said article batch handling units further includes a first weigh hopper gate operating rotary solenoid and a second weigh hopper gate operating rotary solenoid, said first weigh hopper gate operating rotary solenoid being contained in said driving unit below said rotary solenoids for said pool hopper gates, said second weigh hopper gate operating rotary solenoid being disposed inside said driving-and-weighing unit.

8. The compact combinational weighing apparatus of claim 7 wherein said driving-and-weighing unit has a middle section protruding horizontally towards said weigh hoppers, said middle section having an upper horizontal wall and a lower horizontal wall, pairs of load cells individually associated with said article batch handling units being disposed in part in said protruding section and in part above said second weigh hopper gate operating rotary solenoid.

* * * * *